United States Patent [19]

Nakazawa

[11] Patent Number: 5,610,676
[45] Date of Patent: Mar. 11, 1997

[54] CAMERA PERMITTING CHANGE-OVER OF PHOTOGRAPHIC IMAGE PLANE FRAME

[75] Inventor: Isao Nakazawa, Kanagawa, Japan

[73] Assignee: Canon Kabushiki Kaisha, Tokyo, Japan

[21] Appl. No.: 554,666

[22] Filed: Nov. 8, 1995

Related U.S. Application Data

[63] Continuation of Ser. No. 371,593, Jan. 12, 1995, abandoned, which is a continuation of Ser. No. 27,380, Mar. 8, 1993, abandoned.

[30] Foreign Application Priority Data

Mar. 12, 1992 [JP] Japan .................................. 4-053687

[51] Int. Cl.$^6$ ................................................ G03B 19/12
[52] U.S. Cl. ........................................ 396/355; 396/436
[58] Field of Search ................................. 354/94, 95, 96, 354/98, 99, 152, 154, 156, 159

[56] References Cited

U.S. PATENT DOCUMENTS 3,027,819  4/1962  Reiche et al. ........................... 354/154

FOREIGN PATENT DOCUMENTS 1267624  10/1989  Japan .................................... 354/154

Primary Examiner—Howard B. Blankenship
Attorney, Agent, or Firm—Robin, Blecker, Daley & Driscoll

[57] ABSTRACT

In a single-lens reflex camera having a quick-return mirror and a built-in mechanism for change-over between different photographic image plane frames, a light blocking member is arranged to be movable into or out of a photo-taking optical path by swinging around the same or approximately the same rotation axis of the quick-return mirror and to block a part of a photographing light flux to prevent the part of the light flux from reaching the photographic image plane when it is within the photo-taking optical path, so that a photographic image plane frame which differs from a normal photographic image plane frame can be formed by this light blocking member.

21 Claims, 4 Drawing Sheets

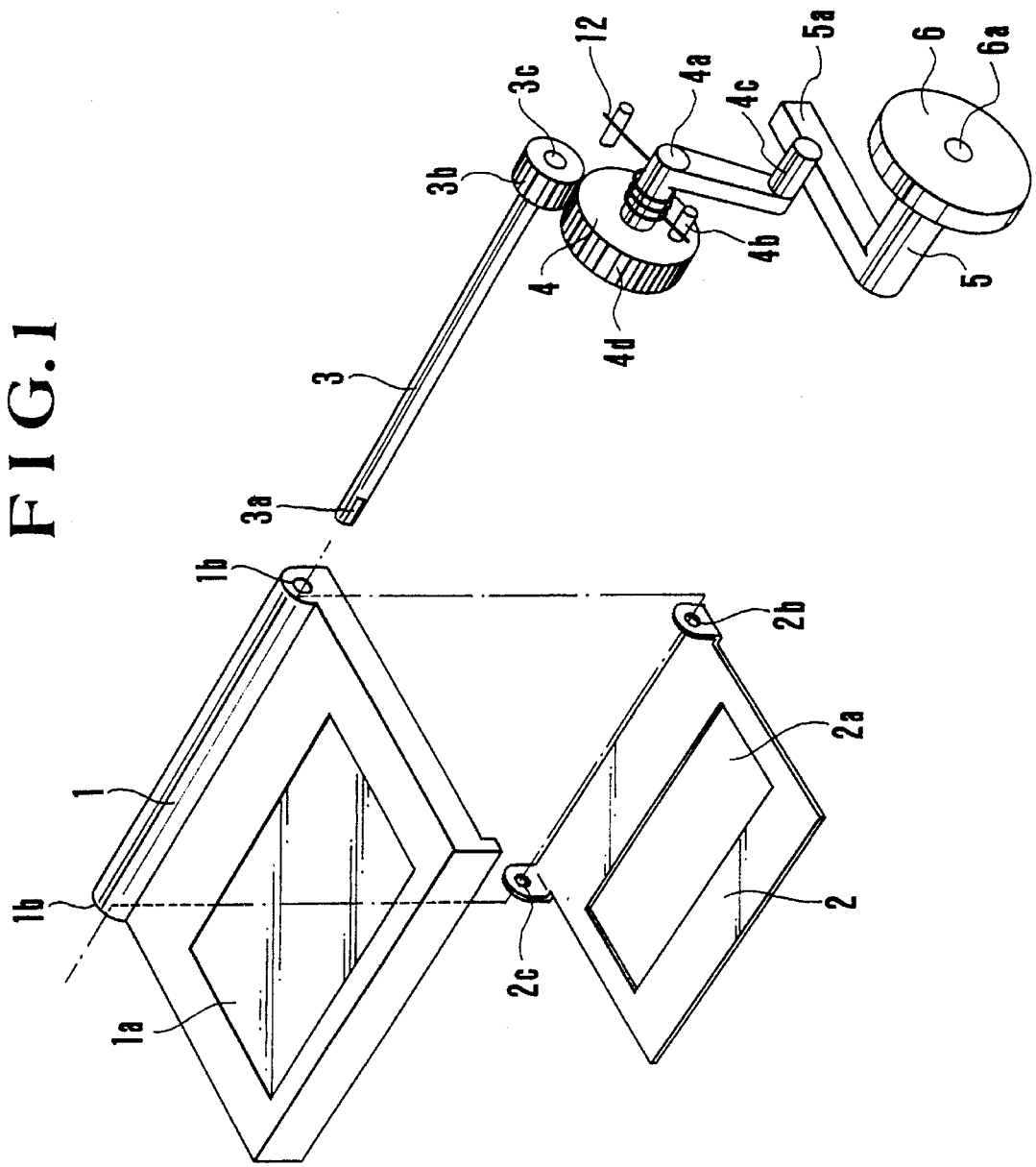

CAMERA PERMITTING CHANGE-OVER OF PHOTOGRAPHIC IMAGE PLANE FRAME

This is a continuation application under 37 CFR 1.62 of prior application Ser. No. 08/371,593, filed on Jan. 12, 1995 (abandoned), which is a continuation of Ser. No. 08/027,380, filed on Mar. 8, 1993 (abandoned).

BACKGROUND OF THE INVENTION

1. Field of the Invention

This invention relates to a camera having a mechanism for changing the frame of its photographic image plane from one frame over to another.

2. Description of the Related Art

At present, the photographic image plane frames of cameras are mostly arranged to be in a sidewise long shape measuring 24×36 mm for a 35 mm silver-halide film which is placed in a film cartridge and is most prevalent among other types of silver-halide films. In addition to this sidewise long shape (hereinafter referred to as the normal size), there are other image plane frame sizes including a half size which is vertically long and a panorama size which is much longer sidewise. To avoid a confusion at photofinishing, developing laboratories, it has been practiced to arrange the camera of the kind using the film of the above-stated size to permit taking shots all at the same size of the photographic image plane frame for the whole of one roll of film by inhibiting change-over of the image plane frame from one size to another after the back lid of the camera is closed. However, printing a photograph in the panorama size has recently become very popular. As a result, a camera which is arranged to permit easy manual selection from outside between different photographic image plane frames has come to be desired. Some cameras that are arranged to meet this requirement have already been manufactured.

A lens shutter type camera has nothing within a space between the film surface and a photo-taking lens. Therefore, a mask for change-over from one photographic image plane frame to another can be retractively arranged immediately before the film surface without difficulty. On the other hand, in the case of a single-lens reflex camera, it is very difficult to arrange such a mechanism because of a quick-return mirror which is arranged in front of the film surface.

Therefore, the conventional single-lens reflex camera has been arranged to permit change-over between different photographic image plane frames only by mounting an adapter in the rear of the shutter after opening the back lid of the camera.

However, with the photographic image plane frame change-over arranged to be effected by means of the adapter like in the case of the conventional single-lens reflex camera, it is impossible to permit the change-over by an external (manual) operation while one roll of film has not been completely used for taking shots. One roll of film, therefore, must be used for shooting with one and the same photographic image plane frame.

Another problem with the adapter mounting type change-over arrangement lies in that the change-over operation is troublesome as it necessitates the work of mounting the adapter on the camera. Besides, some arrangement is necessary for stowing the adapter when it is not in use. This has presented a further problem.

SUMMARY OF THE INVENTION

It is an object of this invention to provide a camera which is arranged to eliminate the above-stated troublesomeness of the photographic image plane frame change-over operation necessitated by the conventional camera of the kind having a quick-return mirror.

To attain this object, a camera of the kind having mirror means arranged to be movable between a position in which the mirror means guides light of an object to be photographed to a viewfinder system by reflecting the light of the object halfway in a photo-taking optical path leading to a photographic image plane and another position in which the mirror means is located outside the photo-taking optical path without blocking the light of the object in taking a photographing shot is arranged as an embodiment of this invention to include light blocking means. The position of the light blocking means is arranged to be selectively changed over between a first position in which the light blocking means is located within the photo-taking optical path and blocks a part of the light of the object to prevent the part of the light of the object from reaching the photographic image plane and a second position in which the light blocking means is located outside the photo-taking optical path and does not block the light of the object, and a photographic image plane frame is changed over by the change-over of the position of the light blocking means.

It is another object of the invention to provide a camera of the above-stated kind, wherein the light blocking means is arranged to move in association with the movement of the mirror means, thereby obviating the necessity of arranging any special space for stowing the light blocking means when the light blocking action of the light blocking means is not required. The arrangement saves a space which is otherwise necessary.

These and other objects and features of this invention will become apparent from the following detailed description of an embodiment thereof taken in connection with the accompanying drawings.

BRIEF DESCRIPTION OF THE DRAWINGS

FIG. 1 is an oblique view showing the essential parts of a mechanism provided for change-over between different photographic image plane frames in a camera arranged as an embodiment of this invention.

DETAILED DESCRIPTION OF THE PREFERRED EMBODIMENT

Figure 2A:
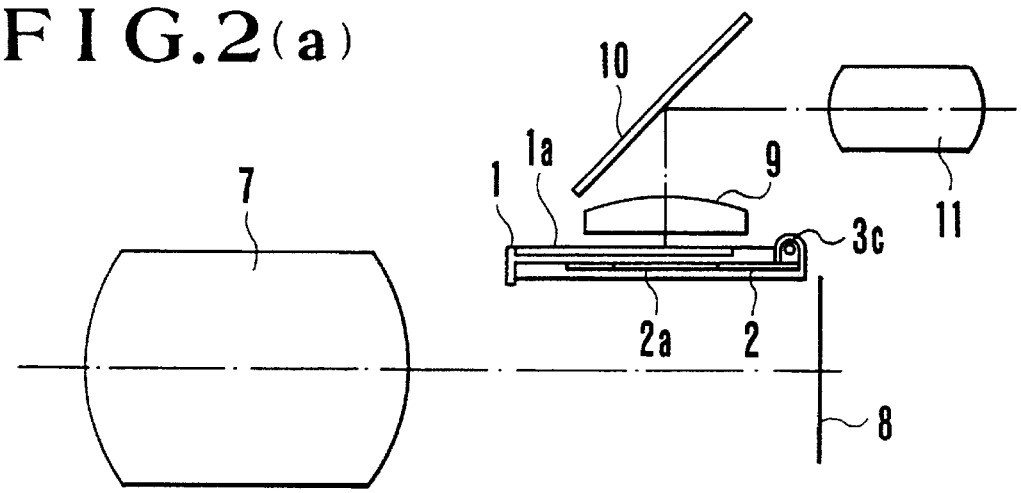
FIGS. 2(a), 2(b) and 2(c) illustrate the operation of the camera having the mechanism shown in FIG. 1.

FIGS. 1 to 4(b) show a camera arranged according to this invention as an embodiment thereof. The following describes the embodiment with reference to these drawings:

FIG. 1 shows the essential parts of a mechanism provided in the camera for change-over between different photographic image plane frames. Referring to FIG. 1, a quick-return mirror for deflecting luminous flux 1 has a light reflecting part 1a which is formed in the middle part and hole parts 1b which are formed in two sides. A mask member 2 has an aperture part 2a which is formed in its middle part and a circular hole 2b and a two-way-taking hole 2c which are respectively formed in bent-up parts formed on the two sides of the mask member 2. A support bar 3 has a two-way-taking part 3a formed at one end and a gear part 3b secured to the other end. The support bar 3 is thus arranged to pierce through the hole parts 1b of the quick-return mirror 1 and the hole parts 2b and 2c of the mask member 2 and to be carried by the camera body which is not shown in such a way as to be rotatable on a shaft part 3c thereof.

A connection member 4 consists of a gear part 4d which engages the gear part 3b of the support bar 3, a shaft part 4a on which the gear part 4d is rotatable and a dowel 4b to which a spring 12 is attached. The spring 12 exerts an urging force on the connection member 4 to urge it to turn counterclockwise. A dowel 4c is formed at the fore end of an arm part of the connection member 4. A mask restricting member 5 is unified in one body with an operation member 6 which is exposed to the outside. The mask restricting member 5 has an arm part 5a and is arranged to be swingable on the shaft 6a of the operation member 6. In FIG. 1, the quick-return mirror 1 is shown as in a moved-up state.

Figure 2B:
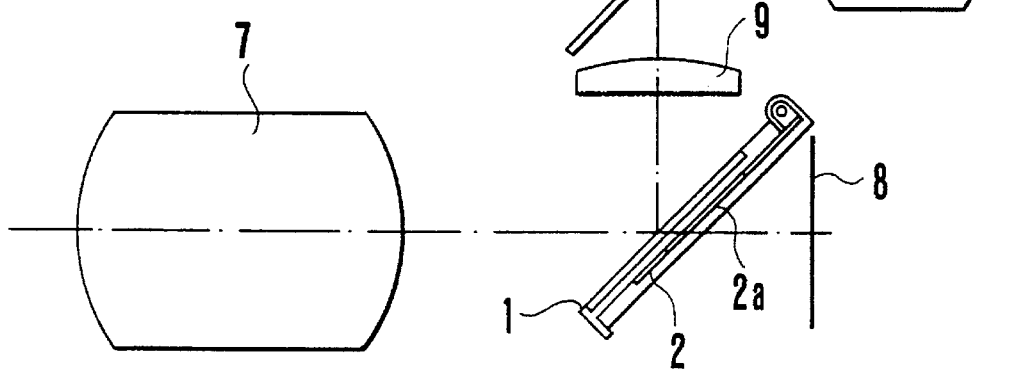
Figure 2C:
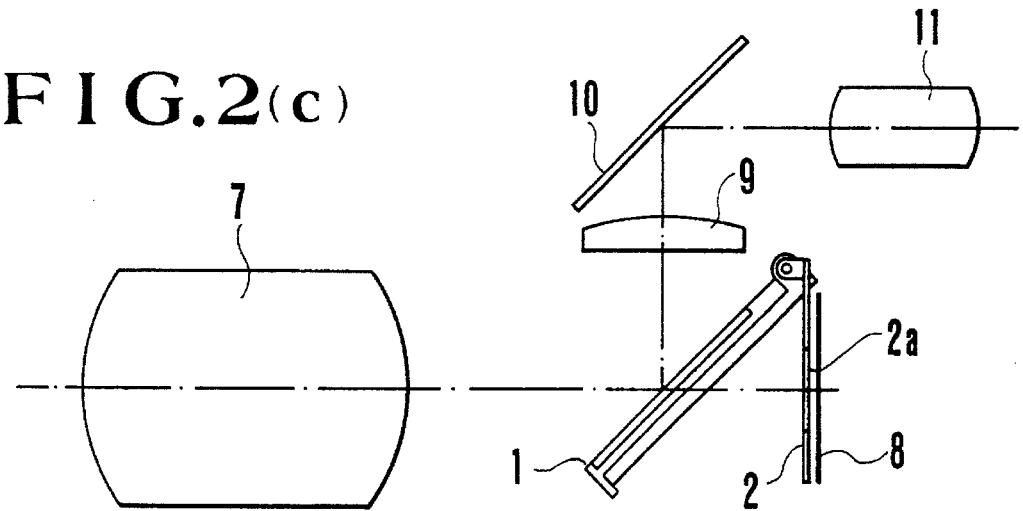

FIGS. 2(a), 2(b) and 2(c) are sectional views taken across a middle part of the camera. These drawings show a photo-taking lens 7, a photographic film 8, a condenser lens 9, a viewfinder mirror 10, and a viewfinder lens 11. The quick-return mirror 1 is shown as in a moved-up state in FIG. 2(a), as in a moved-down state in FIG. 2(b), and as in a state of having the mask member 2 disposed in front of the film 8.

Figure 3A:
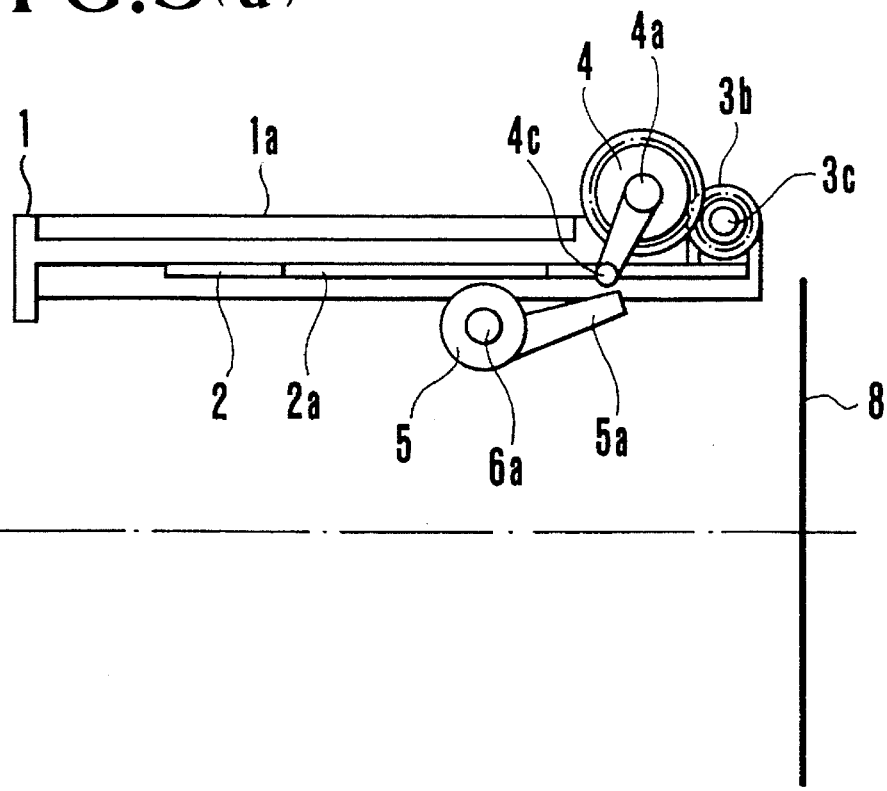
FIGS. 3(a) and 3(b) illustrate the operation of the mechanism of FIG. 1 performed by using a normal photographic image plane frame.
Figure 3B:
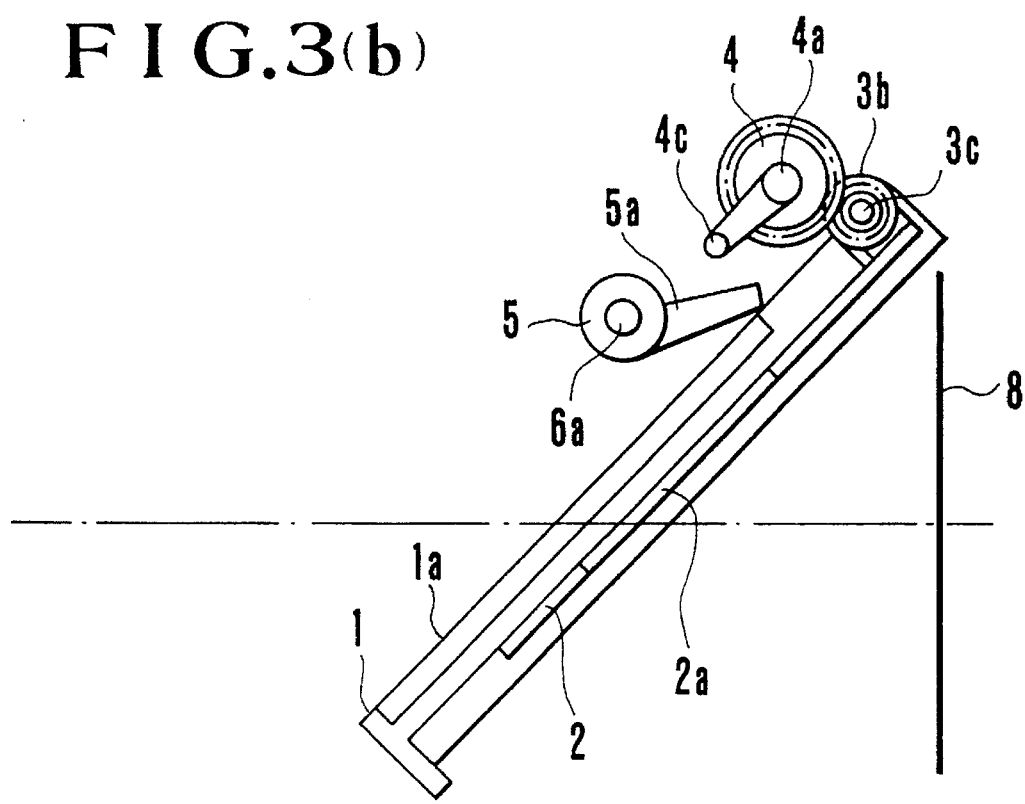

The operation of the camera which is arranged as mentioned above is described as follows: The camera has the quick-return mirror 1 normally in a moved-down state as shown in FIGS. 2(b) and 3(b). Under this condition, light of an object to be photographed which passes through the photo-taking lens 7 is reflected by the light reflecting part 1a of the quick-return mirror 1. The reflected light passes through the condenser lens 9 and, after that, is again reflected by the viewfinder mirror 10. The reflected light from the mirror for deflecting luminous flux 10 comes to the viewfinder lens 11 to enable the operator of the camera to see an image of the object to be photographed. When the operator performs a shooting action by pushing a release button, the camera commences to perform a photographing operation. As a part of the photographing operation, the quick-return mirror 1 is driven by a mirror driving mechanism (not shown) to be retracted to its moved-up position away from a photo-taking optical path as shown in FIGS. 2(a) and 3(a). The mirror driving mechanism may be arranged in a known manner. Therefore, details of the mirror driving mechanism are omitted from description herein.

After the quick-return mirror 1 is thus moved to its moved-up position, an exposure is made with the light of the object imaged on the surface of the film 8 by opening a known shutter which is not shown. Upon completion of the exposure which is made appositely to the luminance of external light, the shutter is closed. After the shutter is closed, the quick-return mirror 1 is again driven by the mirror driving mechanism to come back to its moved-down position.

FIGS. 3(a) and 3(b) show the moved-up and moved-down states of the quick-return mirror 1, respectively, which are obtained when the shooting action is performed by using the normal photographic image plane frame. In this case, the arm part 5a of the mask restricting member 5 is located away from the dowel 4c of the connection member 4. Therefore, the turning motion of the connection member 4 is not restricted. Since the connection member 4 is being urged to move counterclockwise by the urging force of the spring 12, the support bar 3 to which the gear part 3b is secured in a state of engaging the gear part 4d of the connection member 4 is urged to move clockwise. Further, since the two-way-taking part 3a of the support bar 3 is engaging the two-way-taking hole part 2c of the mask member 2, the mask member 2 is also urged clockwise together with the support bar 3. Therefore, the mask member 2 remains in repose in a state of abutting on the reverse side of the quick-return mirror 1 as shown in FIGS. 2(b) and 3(b). With the camera in the above-stated state of taking a shot using the normal photographic image plane frame, when the quick-return mirror 1 begins to swing clockwise around the shaft 3c in response to the moving-up action on the quick-return mirror 1 as mentioned above, the mask member 2 which is in repose in the state of abutting on the reverse side of the quick-return mirror 1 also begins to swing clockwise around the shaft 3c under the urging force of the spring 12. Thus, the quick-return mirror 1 and the mask member 2 swing together. FIGS. 2(a) and 3(a) show the quick-return mirror 1 as in a moved-up state. However, since the mask member 2 moves together with the quick-return mirror 1 both for the moved-up and moved-down states of the quick-return mirror 1, the mask member 2 is, in this instance, free from any restricting action of the mask restricting member 5.

Figure 4A:
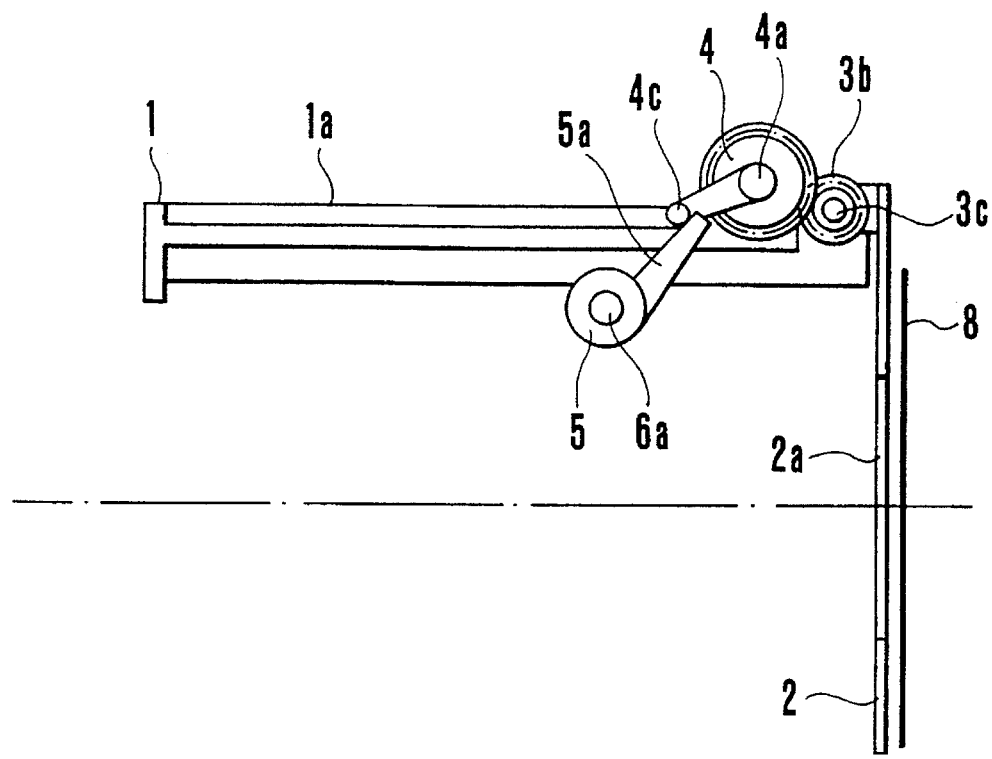
FIGS. 4(a) and 4(b) illustrate the operation of the mechanism of FIG. 1 performed by using a photographic image plane frame which is smaller than the normal photographic image plane.
Figure 4B:
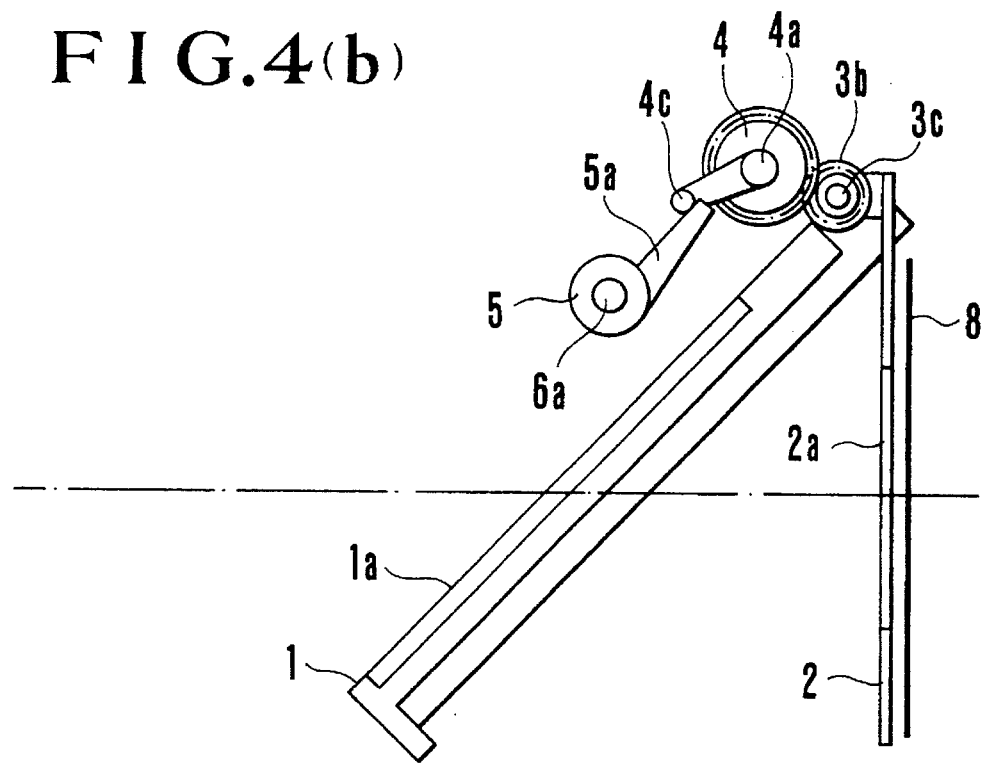

FIGS. 4(a) and 4(b) show the quick-return mirror 1 respectively as in the moved-up and moved-down states obtained with the normal photographic image plane frame changed over to another photographic image plane frame by means of the mask member 2 for blocking a part of luminous flux. The change-over of the photographic image plane frame is accomplished in the following manner:

When the camera operator operates the operation member 6 to rotate counterclockwise, the mask restricting member 5 also rotates counterclockwise around the shaft 6a. Then, the arm part 5a of the mask restricting member 5 pushes the dowel 4c of the connection member 4 to cause the connection member 4 to rotate clockwise against the urging force of the spring 12. The clockwise rotation of the connection member 4 then causes the support bar 3 and the mask member 3 to rotate counterclockwise through the gear part 3b which engages the gear part 4d of the connection member 4. As a result, the mask member 2 comes to be disposed in front of the film 8 as shown in FIGS. 4(a) and 4(b). Accordingly, the normal photographic image plane frame is changed over to the aperture part 2a of the mask member 2 which then serves as a new frame of the photographic image plane. Even if the quick-return mirror 1 is moved up or down under this condition, the mask member 2 is kept in front of the film 8 by the restricting action of the mask restricting member 5 as shown in FIG. 4(a) which shows the quick-return mirror 1 as in the moved-up state and FIG. 4(b) which shows the quick-return mirror 1 as in the moved-up state. Under this condition, therefore, a shot can be taken with the photographic image plane frame thus defined by the mask member 2.

As described in the foregoing, in the case of this embodiment, the mechanism for change-over between the different photographic image plane frames is arranged within the camera as an integral part thereof. In changing one photographic image plane frame over to the other, the change-over can be accomplished as desired by simply operating the camera from outside. The arrangement thus obviates the necessity of mounting and demounting an adapter for changing the photographic image plane frame on and from the camera like in the conventional camera. The arrangement thus obviates the necessity of carrying around the adapter together with the camera.

What is claimed is:

1. A camera comprising:

luminous flux deflecting means for deflecting luminous flux, said luminous flux deflecting means being capable of changing a deflecting state through its own movement;

light blocking means for blocking at least a part of the luminous flux; and selecting means for selecting between a first state in which said light blocking means follows a movement of said luminous flux deflecting means and a second state in which said light blocking means does not follow a movement of said luminous flux deflecting means.

2. A camera according to claim 1, further comprising enabling means for enabling said light blocking means to follow said luminous flux deflecting means.

3. A camera according to claim 2, wherein said enabling means comprises an elastic member.

4. A camera according to claim 2, wherein said selecting means comprises means for selecting between a third state in which an enabling force of said enabling means acts on said light blocking means and a fourth state in which an enabling force of said enabling means does not act on said light blocking means.

5. A camera according to claim 1, wherein said luminous flux deflecting means includes means for travelling along a predetermined travelling path, and said light blocking means includes means for travelling along a substantially same travelling path as said predetermined travelling path.

6. A camera according to claim 1, wherein said luminous flux deflecting means includes means for permitting said luminous flux deflecting means to rotatably move around a predetermined axis.

7. A camera according to claim 6, wherein said light blocking means includes means for permitting said light blocking means to rotatably move around a substantially same axis as said predetermined axis.

8. A camera according to claim 1, wherein said luminous flux deflecting means includes means for permitting said luminous flux deflecting means to move to a position inside an optical path for the luminous flux and a position outside the optical path of the luminous flux.

9. A camera according to claim 1, wherein said luminous flux deflecting means includes means for permitting a change-over between a state in which the luminous flux is guided to a photographic image forming unit and a state in which the luminous flux is not guided to the photographic image forming unit.

10. A camera according to claim 9, wherein said luminous flux deflecting means includes means for changing a situation from the state in which the luminous flux is not guided to the photographic image forming unit to the state in which the luminous flux is guided to the photographic image forming unit.

11. A camera according to claim 9, wherein said luminous flux deflecting means includes means for permitting a change-over between a state in which the luminous flux is guided to an image recording medium and a state in which the luminous flux is not guided to the image recording medium.

12. A camera according to claim 1, wherein said luminous flux deflecting means includes means for permitting a change-over between a state in which the luminous flux is guided to a viewfinder image forming unit and a state in which the luminous flux is not guided to the viewfinder image forming unit.

13. A camera according to claim 1, wherein said luminous flux deflecting means includes a mirror member for reflecting the luminous flux.

14. A camera according to claim 1, wherein said light blocking means includes means for blocking a part of the luminous flux to form an image plane frame of an image to be formed with the luminous flux.

15. A camera according to claim 14, wherein said light blocking means includes means for varying the image plane frame between said first state and said second state.

16. A camera according to claim 15, wherein said selecting means includes means for selecting as to whether or not said light blocking means should follow a movement of said luminous flux deflecting means in accordance with a state of additional selecting means for selecting the image plane frame.

17. A camera according to claim 1, wherein said light blocking means includes means for varying a light blocking state between said first state and said second state.

18. A camera according to claim 17, wherein said light blocking means includes means for saving from an optical path of the luminous flux through following a movement of said luminous flux deflecting means.

19. A camera according to claim 17, wherein said light blocking means includes means for causing said light blocking means to be located inside an optical path of the luminous flux when said light blocking means does not follow a movement of said luminous flux deflecting means.

20. An optical instrument comprising:

luminous flux deflecting means for deflecting luminous flux, said luminous flux deflecting means being capable of changing a deflecting state through its own movement;

light blocking means for blocking at least a part of the luminous flux; and selecting means for selecting between a first state in which said light blocking means follows a movement of said luminous flux deflecting means and a second state in which said light blocking means does not follow a movement of said luminous flux deflecting means.

21. A luminous flux blocking apparatus comprising:

luminous flux deflecting means for deflecting luminous flux, said luminous flux deflecting means being capable of changing a deflecting state through its own movement;

light blocking means for blocking at least a part of the luminous flux; and selecting means for selecting between a first state in which said light blocking means follows a movement of said luminous flux deflecting means and a second state in which said light blocking means does not follow a movement of said luminous flux deflecting means.

* * * * *